(12) United States Patent
Lu et al.

(10) Patent No.: US 8,811,577 B2
(45) Date of Patent: Aug. 19, 2014

(54) ADVANCED TELECOMMUNICATIONS COMPUTING ARCHITECTURE DATA EXCHANGE SYSTEM, EXCHANGE BOARD AND DATA EXCHANGE METHOD

(75) Inventors: Fangmin Lu, Shenzhen (CN); Jianxing Liao, Shenzhen (CN); Ying Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/450,020

(22) Filed: Apr. 18, 2012

(65) Prior Publication Data
US 2012/0307986 A1 Dec. 6, 2012

Related U.S. Application Data

(63) Continuation of application No. PCT/CN2011/074934, filed on May 30, 2011.

(51) Int. Cl.
| | | |
|---|---|---|
| *H04M 11/00* | (2006.01) | |
| *H04L 12/56* | (2006.01) | |
| *H04Q 3/56* | (2006.01) | |
| *H04L 12/24* | (2006.01) | |

(52) U.S. Cl.
CPC ...... *H04L 49/60* (2013.01); *H04Q 2213/13292* (2013.01); *H04Q 2213/13196* (2013.01); *H04L 12/24* (2013.01); *H04Q 2213/13003* (2013.01); *H04L 49/40* (2013.01); *H04L 41/00* (2013.01); *H04Q 3/56* (2013.01)
USPC ......... 379/90.01; 379/21; 379/22; 379/22.02; 379/22.03; 702/89; 375/148; 398/50

(58) Field of Classification Search
USPC ................ 379/90.01; 455/561; 375/148, 144; 398/50, 51, 54
See application file for complete search history.

(56) References Cited

U.S. PATENT DOCUMENTS 6,895,038 B2 * 5/2005 Saito et al. ............. 375/148
(Continued)

FOREIGN PATENT DOCUMENTS

| CN | 2845326 Y | 12/2006 |
|---|---|---|
| WO | 2007053995 A1 | 5/2007 |

OTHER PUBLICATIONS

Translation of International search report for International application No. PCT/CN2011/074934, dated Mar. 15, 2012, total 3 pages.
PICMG, PICMG 3.0 short form specification, Jan. 2003, total 34 pages.

(Continued)

*Primary Examiner* — Joseph J Nguyen
(74) *Attorney, Agent, or Firm* — Leydig, Voit & Mayer, Ltd.

(57) ABSTRACT

Embodiments of the present invention disclose an ATCA data exchange system which includes: a backboard, at least one exchange board and service board. The exchange board includes at least one Fabric port group, each of which is connected to a service board through the backboard to form a first exchange channel for broadband service, the Fabric port group includes four difference sending and receiving port pairs, and each port pair includes a pair of difference receiving and sending ports. A connector 20 in the Fabric interface of the exchange board includes at least one port pair, and each port pair is connected to a service board through the backboard to form a second exchange channel and is configured for a separate narrowband service data exchange that is independent of the broadband data exchange. Thus to simplify the processing of narrowband data and to decrease the time delay.

9 Claims, 8 Drawing Sheets

(56) References Cited

U.S. PATENT DOCUMENTS

| | | | |
|---|---|---|---|
| 8,155,520 B1* | 4/2012 | West et al. | 398/50 |
| 2007/0192051 A1* | 8/2007 | Izumi | 702/89 |
| 2008/0152217 A1 | 6/2008 | Greer | |
| 2009/0149221 A1* | 6/2009 | Liu et al. | 455/561 |

OTHER PUBLICATIONS

Search report issued in corresponding European patent application No. 11795084.0, dated Feb. 13, 2013, total 7 pages.

Alexandra Dana et al., "ATCA: Its performance and application for real time systems," Jun. 4, 2005, total 6 pages.

* cited by examiner

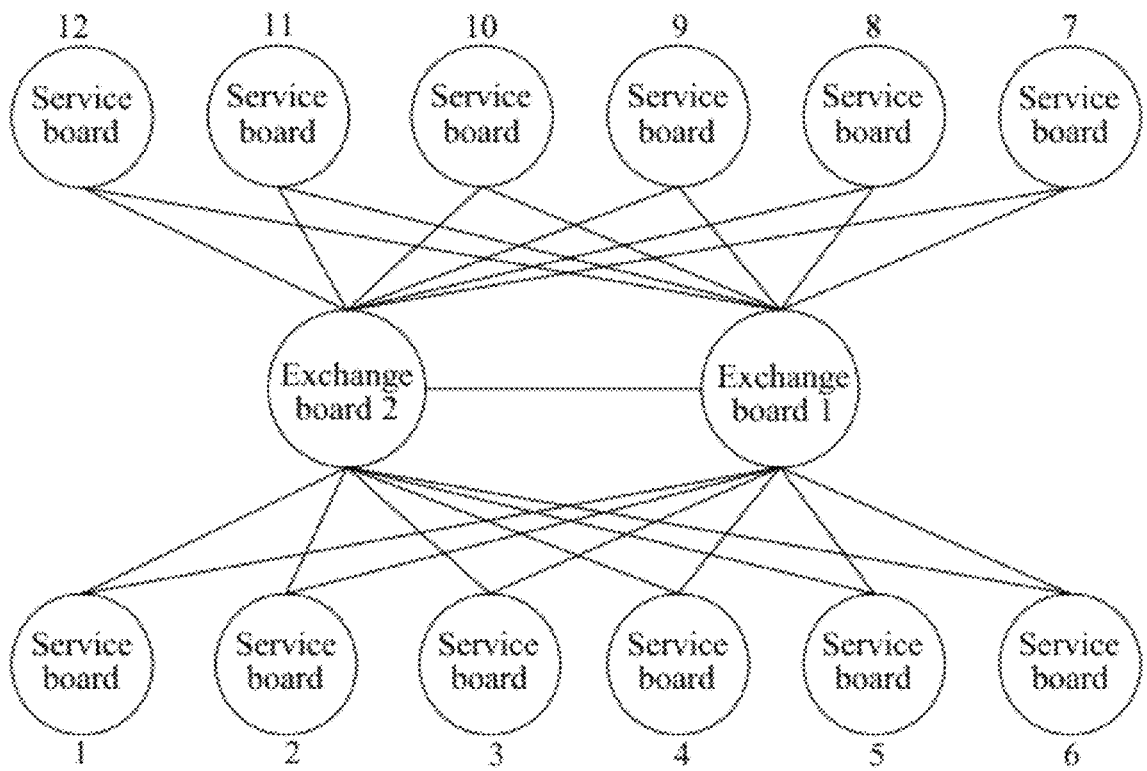
FIG. 1 <Prior Art>
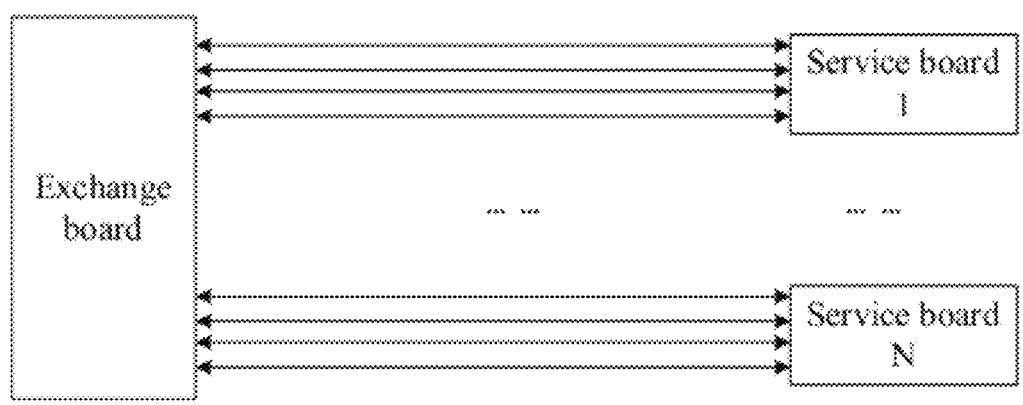
FIG. 2 <Prior Art>

US 8,811,577 B2

ADVANCED TELECOMMUNICATIONS COMPUTING ARCHITECTURE DATA EXCHANGE SYSTEM, EXCHANGE BOARD AND DATA EXCHANGE METHOD

CROSS-REFERENCE TO RELATED APPLICATIONS

This application is a continuation of International Application No. PCT/CN2011/074934, filed on May 30, 2011, which is hereby incorporated by reference in its entirety.

FIELD OF THE INVENTION

The present invention relates to the field of communications technologies, and in particular, to an advanced telecommunications computing architecture data exchange system, an exchange board and a data exchange method.

BACKGROUND OF THE INVENTION

The ATCA (Advanced Telecommunications Computing Architecture, ATCA) is an open industry standard architecture formulated and developed by the PICMG (Peripheral Component Interconnect Industrial Computer Manufacturers Group), and is oriented as a common hardware platform technology for communications equipment and computing servers. Communications equipment and computing server equipment that meet various requirements may be constructed through various modules based on ATCA standards.

PICMG 3.0 standards define the structure of the ATCA and specifications such as backboard interconnection topology. It is stipulated that the ATCA has a structure of a backboard in the middle with a front board and a rear board, where exchange boards (Hub Board) and service boards (Node Board, also referred to as a node board) are front boards, and service boards are interconnected through Full Mesh (Full Mesh) topology architecture or through exchange boards. According to the PICMG 3.0 standards, each subrack of the ATCA supports 16 slots at the most, and supports 16 boards (including exchange boards and service boards) correspondingly. When service boards are interconnected through exchange boards by adopting a dual star topology architecture, the ATCA supports 14 service boards and two exchange boards at the most, and each exchange board is interconnected with the other 15 boards (14 service boards and one exchange board) through the backboard.

During application, limited by the technological level, an ATCA product generally supports only 14 slots, that is, supporting 14 boards. During application, two exchange boards are connected to 12 service boards through a dual star topology architecture. As shown in FIG. 1, an exchange board 1 is connected to the other 12 service boards and an exchange board 2. Similarly, the exchange board 2 is connected to the other 12 service boards and the exchange board 1.

PICMG 3.0 specifications also define the size of ATCA boards and subracks, where connection zones of boards and the backboard are divided into three zones: Zone1 (zone 1), Zone2 (zone 2) and Zone3 (zone 3). Zone1 and Zone2 are defined according to the specifications, to ensure that ATCA boards of all manufacturers are compatible. Zone3 may be customized, and different manufacturers define the Zone3 differently. Zone2 is defined as a Fabric interface (fabric interface), which is the major service data interaction zone of the entire ATCA, and is also referred to as a service data plane. Referring to FIG. 2, in Zone2, each slot provides four signal channels constituted by difference sending and receiving port pairs to implement a bidirectional Fabric (fabric) exchange channel, which is mainly used for broadband data exchange (such as Internet protocol IP data with relatively large bandwidth) between service boards and exchange boards. During implementation, four difference sending and receiving port pairs on an exchange board are connected to a service board through the backboard to form a Fabric exchange channel. Each difference sending and receiving port pair includes a pair of difference receiving ports and a pair of difference sending ports. For the convenience of description, four difference sending and receiving port pairs are called a "Fabric port group" for short.

With extensive application of the ATCA platform in the telecommunications computing control field, in many application scenarios, in addition to the IP service, some narrowband services (with smaller bandwidth as compared with services implemented through Fabric channels), such as the FC (Fiber Channel, FC), TDM (Time-division multiplexing, TDM), SAS (Serial Attached SCSI, SAS), SCSI (Small Computer System Interface, SCSI), SATA (Serial ATA, SATA) and SSD (solid-state drive, SSD), need to be supported. In the prior art, the method for meeting requirements of services such as the FC, SCSI, SAS and TDM on the ATCA platform is: adopting an ASIC or logic chip (such as an FPGA) to convert narrowband service data of the FC, SCSI, TDM and SAS into IP packets, and performing service data exchange through a Fabric exchange channel (one of the signal channels constituted by difference sending and receiving port pairs) of the ATCA.

In the implementation of the present invention, the inventors find that the prior art at least has the following problems.

In the prior art, when data of narrowband services such as the TDM is converted into IP packets, and data exchange is implemented through a Fabric exchange channel, the IP protocol is complex. Therefore, when a dedicated ASIC or logic chip (such as an FPGA) is adopted to implement IP packet conversion, implementation at the interface side is complex, and in addition, a certain time delay is caused by the processing, thereby affecting the service performance.

SUMMARY OF THE INVENTION

Embodiments of the present invention provide an advanced telecommunications computing architecture data exchange system, a related exchange board and a related data exchange method, which are used for solving the problem of complex implementation of narrowband data exchange and high manufacturing costs in the prior art.

An embodiment of the present invention provides an advanced telecommunications computing architecture ATCA data exchange system, including:

a backboard, at least one exchange board and at least one service board; where the exchange board includes at least one Fabric port group, and each Fabric port group is connected to one service board through the backboard to form a first exchange channel for broadband service data exchange, where the Fabric port group includes four difference sending and receiving port pairs, and each difference sending and receiving port pair includes a pair of difference receiving ports and a pair of difference sending ports; and a connector 20 in Zone2 of the exchange board includes at least one difference sending and receiving port pair, and each difference sending and receiving port pair is connected to a service board through the backboard to form a second exchange channel, which is independent of the first exchange channel and is configured for a separate narrowband service data exchange that is independent of the broadband data exchange.

An embodiment of the present invention further provides an exchange board, which is used in a first advanced telecommunications computing architecture ATCA data exchange system, and the ATCA data exchange system includes a backboard, at least one exchange board and at least one service board; where the exchange board includes at least one Fabric port group, and each Fabric port group is connected to one service board through the backboard to form a first exchange channel for broadband service data exchange, where the Fabric port group includes four difference sending and receiving port pairs, and each difference sending and receiving port pair includes a pair of difference receiving ports and a pair of difference sending ports; and a connector 20 in Zone2 of the exchange board includes at least one difference sending and receiving port pair, and each difference sending and receiving port pair is connected to a service board through the backboard to form a second exchange channel, which is independent of the first exchange channel, for narrowband service data exchange that is independent of the broadband data exchange through the second exchange channel separately.

An embodiment of the present invention further provides an ATCA data exchange method applied in an ATCA data exchange system, where the ATCA data exchange system includes:

a backboard, at least one exchange board and at least one service board;

the exchange board includes at least one Fabric port group, and each Fabric port group is connected to one service board through the backboard to form a first exchange channel for broadband service data exchange, where the Fabric port group includes four difference sending and receiving port pairs, and each difference sending and receiving port pair includes a pair of difference receiving ports and a pair of difference sending ports; and a connector 20 in Zone2 of the exchange board includes at least one difference sending and receiving port pair, and each difference sending and receiving port pair is connected to one service board through the backboard to form a second exchange channel, which is independent of the first exchange channel and is configured for a separate narrowband service data exchange that is independent of the broadband data exchange.

The foregoing method includes:

performing broadband service data exchange through the first exchange channel; and performing narrowband service data exchange through the second exchange channel.

The foregoing technical solutions have the following advantages:

Embodiments of the present invention use a connector 20 to form a second exchange channel that is independent of the Fabric exchange channel. Therefore, when narrowband service data exchange that is independent of the broadband data exchange is performed, it is unnecessary to perform data packet conversion before completing data exchange through the Fabric channel, and thereby the processing method is simplified, service delay is decreased and service performance is improved.

BRIEF DESCRIPTION OF THE DRAWINGS

To illustrate the technical solutions according to the embodiments of the present invention more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

FIG. 1 is a topological structural diagram of connection between exchange boards and service boards in an ATCA system in the prior art;

FIG. 2 is a schematic diagram of connection between an exchange board and service boards through Fabric channels in the prior art according to an embodiment of the present invention;

DETAILED DESCRIPTION OF THE EMBODIMENTS

In order to make the objectives, technical solutions and advantages of the present invention more comprehensible, the present invention is further described in detail in the following with reference to the embodiments and accompanying drawings.

Embodiment 1

Figure 3:
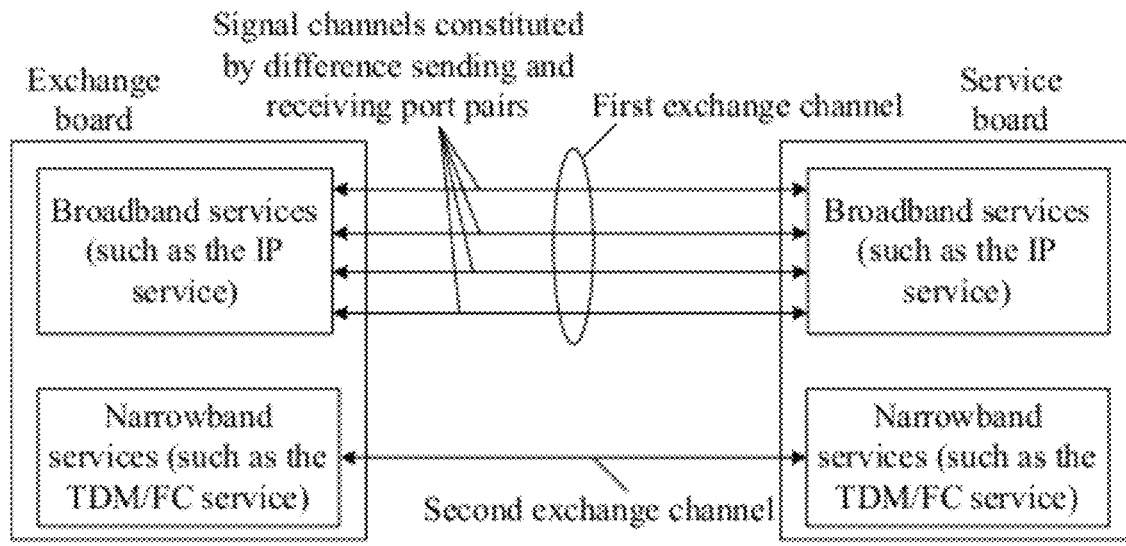
FIG. 3 is a schematic structural diagram of an ATCA system according to Embodiment 1 of the present invention.

The embodiment of the present invention provides an ATCA data exchange system, and referring to FIG. 3, the system includes:

at least one exchange board, at least one service board and a backboard; where the exchange board includes at least one Fabric port group, and each Fabric port group is connected to one service board through the backboard to form a first exchange channel (a Fabric exchange channel) for broadband data exchange, where the Fabric port group includes four difference sending and receiving port pairs, and each difference sending and receiving port pair includes a pair of difference receiving ports and a pair of difference sending ports; and a connector in the exchange board, which is numbered 20 in the Fabric interface defined by the PICMG, includes at least one difference sending and receiving port pair, and each difference sending and receiving port pair is connected to a service board through the backboard to form a second exchange channel, which is independent of the first exchange channel, for narrowband service data exchange that is independent of the broadband data exchange through the second exchange channel separately.

Specifically, in the embodiment of the present invention, the implementation method of the Fabric exchange channel (also referred to as the first exchange channel) is the same as that of a Fabric exchange channel in the prior art shown in FIG. 2, which is in accordance with a standard definition, so that the Fabric exchange channel may be compatible with boards meeting the standards. In addition, the embodiment of the present invention adds an exchange channel that is independent of the Fabric channel, that is, the second exchange channel. The second exchange channel may be used to perform data exchange of narrowband services that are independent of broadband services, that is, data on the second exchange channel is not packed and exchanged through the Fabric channel together with original broadband data, but is exchanged through the new second exchange channel. The broadband and narrowband here are relative concepts. The Fabric exchange channel uses four difference sending and receiving port pairs, while the second exchange channel uses one difference sending and receiving port pair. Therefore, bandwidth supported by the Fabric exchange channel is relatively larger than bandwidth supported by the second exchange channel. For example, the Fabric channel may support an IP service with a bandwidth of 40 G, while the second exchange channel may support a TDM (Time-division multiplexing, TDM) service with a bandwidth of 2 G.

Figure 4:
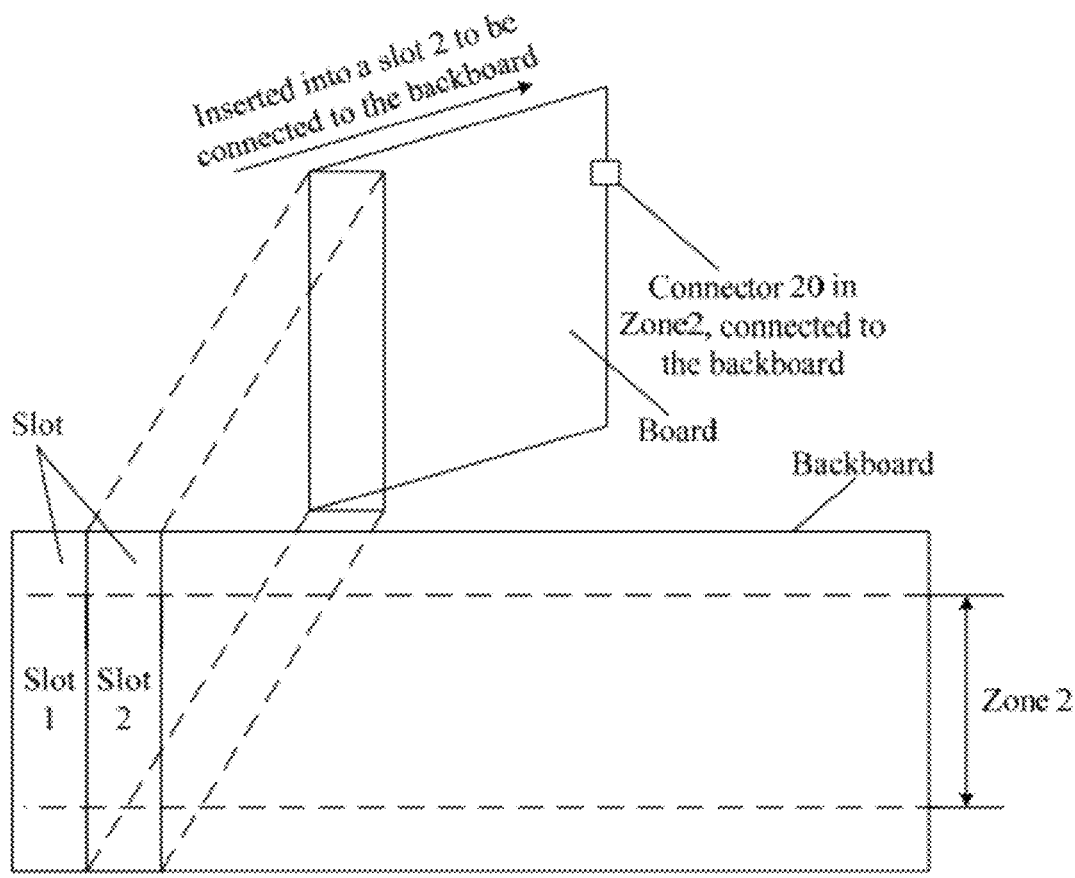
FIG. 4 is a schematic diagram of connection between boards and a subrack according to Embodiment 1 of the present invention.

In the embodiment of the present invention, each board (a service board or an exchange board) is connected (physically and electrically) to the backboard through a connector. The connector 20 indicates a connector numbered 20 in standard definition. FIG. 4 is a schematic diagram of connection through the connector 20 according to the embodiment of the present invention. In FIG. 4, each board (such as a service board or an exchange board) is connected to the backboard by being inserted into a related slot (such as slot 1 and slot 2 in FIG. 4) of a subrack. The specific connection method is: setting a connector (a first connector) in a corresponding zone to be connected of the backboard, setting a connector (a second connector) in a corresponding zone of a board, implementing physical connection and electrical connection between the board and the backboard through interconnection of the two connectors (the first connector and the second connector), and then implementing connection of electrical signals of the board to other boards (other boards are also physically and electrically connected to the backboard through connectors) through cables on the backboard. For the second exchange channel in the embodiment of the present invention, the exchange board is connected to the backboard through a port of the connector 20 in the Fabric interface, while a connector of the service board in the Fabric interface includes a difference sending and receiving port pair that is electrically connected, through the backboard, to the difference sending and receiving port pair that forms the second exchange channel in the connector 20 in the Fabric interface of the exchange board. Specifically, the service board may be connected to the backboard through an idle port of any connector (not limited to the connector 20) in the Fabric interface, and then be electrically connected to the exchange board through cables on the backboard. It should be noted that, during an actual application, a connector on the board and a connector on the backboard are used as a set. Therefore, two connectors may be regarded as one connector or a set of connectors, with one being referred to as a male connector (such as a pin), and the other being referred to as the female connector (such as a socket). This embodiment and the following embodiments do not strictly define the concept of a connector. If not specified, a connector may be regarded as a set of connectors including a male connector and a female connector. The specific selection of connectors and related connection technologies are technologies well-known by persons skilled in the art, which are not described in detail here again.

The embodiment of the present invention uses a connector 20 to form a second exchange channel that is independent of the Fabric exchange channel. Therefore, when narrowband service data exchange that is independent of IP data exchange needs to be performed, it is unnecessary to perform data packet conversion before completing the data exchange through the Fabric channel, and no dedicated ASIC or logic chip is required to perform IP packet conversion processing. In this way, the processing method is simplified, service delay is decreased and service performance is improved.

Besides, the embodiment of the present invention selects the connector 20 to maximize compatibility with existing standard boards. That is, the embodiment of the present invention only changes the connector 20, with the design of the remaining parts still in accordance with the standard definition. Therefore, existing standard boards may still be inserted into parts other than the connector 20 in a sequence of the standard definition, and slot definitions of standard boards are still the same as the standard definitions shown in FIG. 5.

Embodiment 2

The embodiment of the present invention provides more detailed description of the solution based on the foregoing Embodiment 1. The embodiment of the present invention uses an example including two exchange boards and 12 service boards for description, and the topological structure adopts a dual star structure shown in FIG. 1.

Figure 5:
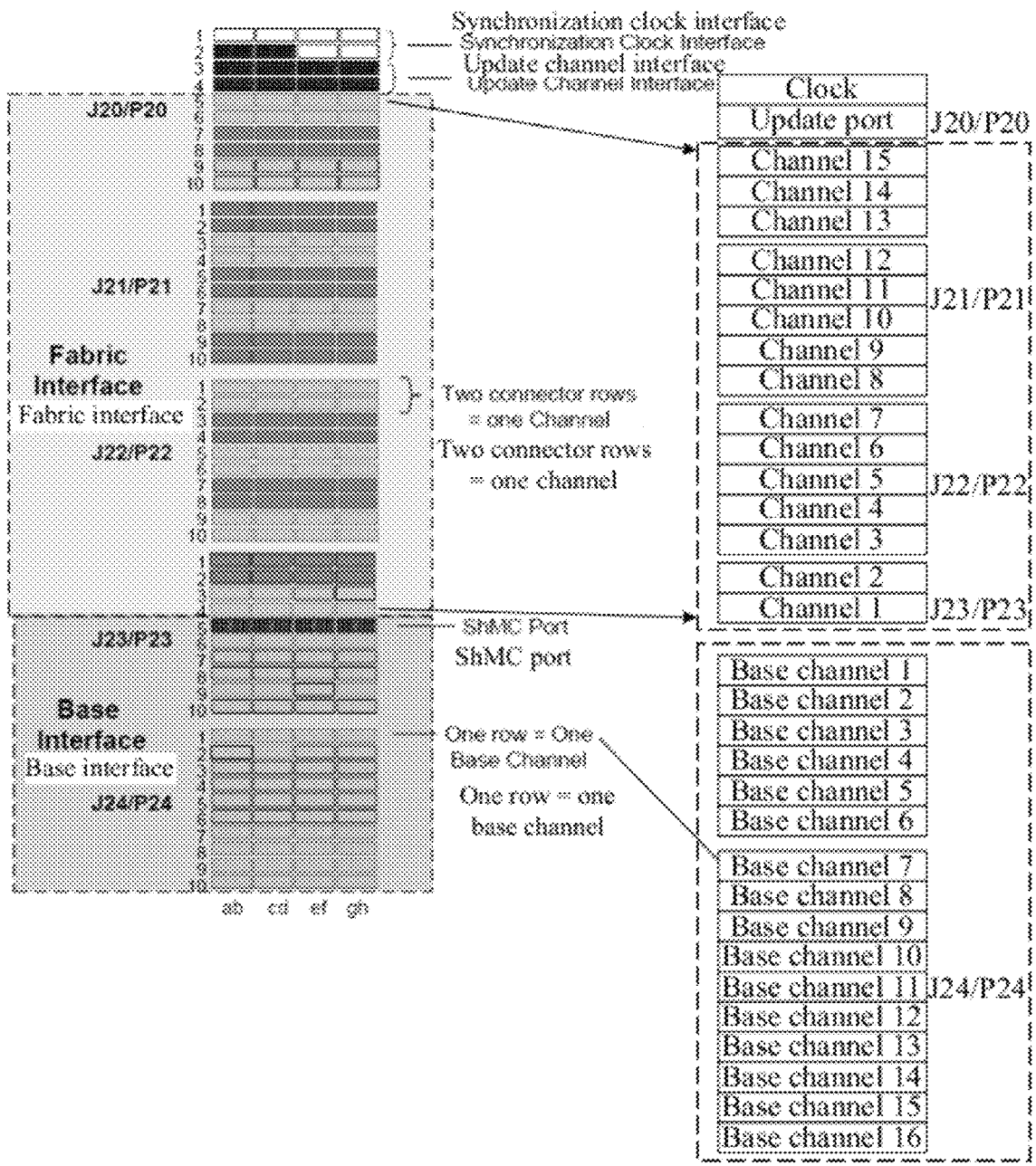
FIG. 5 is a schematic diagram of logical slots of an ATCA system according to Embodiment 2 of the present invention.

FIG. 5 is a schematic diagram of logical slots (some signal definitions related to physical slots) defined in the standards. On the left of FIG. 5, each of J20/P20, J21/P21, J22/P22, J23/P23 and J24/P24 represents a connector among connectors 20-24, where J20 indicates a male connector (such as a pin) of a connector and P20 indicates a female connector (such as a socket) of the connector. The indication methods of the J21/P21, J22/P22, J23/P23 and J24/P24 are similar, which are not described in detail here again. For the convenience of description, the embodiment of the present invention does not strictly distinguish the connector 20 and the connector J20/P20. The connector 20 may also be represented by J20/P20.

As shown in FIG. 5, each connector (such as J20/P20) includes 10*4 difference signal pairs (each small rectangle in FIG. 5 represents each difference signal pair), where the numbers 1-10 represent ten rows and labels ab, cd, ef and gh (at the lower part of the FIG. 5 on the left) represent that each row has four difference signal pairs (ab, cd, ef and gh represents one pair of difference signals respectively).

A Fabric exchange channel may be designed based on the existing standard definition, where four difference sending and receiving port pairs are used as one Fabric exchange channel (a first exchange channel), and each difference sending and receiving port pair includes a pair of difference receiving ports and a pair of difference sending ports, that is, eight difference signal pairs are required ultimately. As shown in FIG. 5, one Fabric exchange channel (such as a Channel (channel) 7 shown on the right of FIG. 5) uses eight difference signal pairs (eight difference signal pairs in total in rows 1 and 2 of the J22/P22 connector in FIG. 5) shown on the left of FIG. 5.

It can be seen from the difference signal pairs on the left of FIG. 5 that, except for J20/P20, 96 difference signal pairs in total may be used for Fabric exchange channels (J21/P21 has 40 (4*10=40) pairs, J22/P22 has 40 (4*10=40) pairs, and J23/P23 has 16 (4*4 (row 1 to row 4)=16) pairs). Therefore, 12 Fabric exchange channels may be supported (each channel requires eight difference signal pairs, and require 96 (12*8=96) difference signal pairs in total). That is, an exchange board may be connected to 12 service boards respectively through 12 Fabric exchange channels.

To implement the second exchange channel that is independent of the Fabric exchange channels, the embodiment of the present invention uses difference signal pairs of the connector 20 (J20/P20) in the Fabric interface (Zone2). Referring to FIG. 5, J20/P20 in the Fabric interface has 24 (6(row 5 to row 10)*4=24) difference signal pairs. For the second exchange channel, each channel requires one difference sending and receiving port pair, that is, a pair of difference receiving ports and a pair of difference sending ports. Therefore, two difference signal pairs (two small rectangles in FIG. 5) shown in FIG. 5 are required. J20/P20 in the Fabric interface has 24 difference signal pairs in total. Therefore, 12 (24/2=12) second exchange channels in total may be supported. That is, an exchange board may be connected to 12 service boards respectively through 12 second exchange channels.

Table 1 lists the definition of each signal in the connector P20 according to the embodiment of the present invention. It can be understood that, the other connector J20 also has its corresponding signal definitions. The definition of each signal of P20 is used as an example for description.

TABLE 1

| Connector | Channel | 1 | 2 | 3 | 4 | 5 | 6 | 7 | 8 |
|---|---|---|---|---|---|---|---|---|---|
| P20 | CLK | CLK1_A+ | CLK1_A− | CLK1_B+ | CLK1_B− | CLK2_A+ | CLK2_A− | CLK2_B+ | CLK2_B− |
|  | UPDATE | UP1_T+ | UP1_T− | UP1_R+ | UP1_R− | CLK3_A+ | CLK3_A− | CLK3_B+ | CLK3_B− |
|  |  | UP2_T+ | UP2_T− | UP2_R+ | UP12_R− | UP3_T+ | UP3_T− | UP3_R+ | UP3_R− |
|  |  | UP4_T+ | UP4_T− | UP4_R+ | UP4_R− | UP5_T+ | UP5_T− | UP5_R+ | UP5_R− |
|  | FC12~11 | FC12_T+ | FC12_T− | FC12_R+ | FC12_R− | FC11_T+ | FC11_T− | FC11_R+ | FC11_R− |
|  | FC10~9 | FC10_T+ | FC10_T− | FC10_R+ | FC10_R− | FC9_T+ | FC9_T− | FC9_R+ | FC9_R− |
|  | FC8~7 | FC8_T+ | FC8_T− | FC8_R+ | FC8_R− | FC7_T+ | FC7_T− | FC7_R+ | FC7_R− |
|  | FC6~5 | FC6_T+ | FC6_T− | FC6_R+ | FC6_R− | FC5_T+ | FC5_T− | FC5_R+ | FC5_R− |
|  | FC4~3 | FC4_T+ | FC4_T− | FC4_R+ | FC4_R− | FC3_T+ | FC3_T− | FC3_R+ | FC3_R− |
|  | FC2~1 | FC2_T+ | FC2_T− | FC2_R+ | FC2_R− | FC1_T+ | FC1_T− | FC1_R+ | FC1_R− |
| P21 | FB12 | FB12_T3+ | FB12_T3− | FB12_R3+ | FB12_R3− | FB12_T2+ | FB12_T2− | FB12_R2+ | FB12_R2− |
|  |  | FB12_T1+ | FB12_T1− | FB12_R1+ | FB12_R1− | FB12_T0+ | FB12_T0− | FB12_R0+ | FB12_R0− |
|  | FB11 | FB11_T3+ | FB11_T3− | FB11_R3+ | FB11_R3− | FB11_T2+ | FB11_T2− | FB11_R2+ | FB11_R2− |
|  |  | FB11_T1+ | FB11_T1− | FB11_R1+ | FB11_R1− | FB11_T0+ | FB11_T0− | FB11_R0+ | FB11_R0− |
|  | FB10 | FB10_T3+ | FB10_T3− | FB10_R3+ | FB10_R3− | FB10_T2+ | FB10_T2− | FB10_R2+ | FB10_R2− |
|  |  | FB10_T1+ | FB10_T1− | FB10_R1+ | FB10_R1− | FB10_T0+ | FB10_T0− | FB10_R0+ | FB10_R0− |
|  | FB9 | FB9_T3+ | FB9_T3− | FB9_R3+ | FB9_R3− | FB9_T2+ | FB9_T2− | FB9_R2+ | FB9_R2− |
|  |  | FB9_T1+ | FB9_T1− | FB9_R1+ | FB9_R1− | FB9_T0+ | FB9_T0− | FB9_R0+ | FB9_R0− |
|  | FB8 | FB8_T3+ | FB8_T3− | FB8_R3+ | FB8_R3− | FB8_T2+ | FB8_T2− | FB8_R2+ | FB8_R2− |
|  |  | FB8_T1+ | FB8_T1− | FB8_R1+ | FB8_R1− | FB8_T0+ | FB8_T0− | FB8_R0+ | FB8_R0− |
| P22 | FB7 | FB7_T3+ | FB7_T3− | FB7_R3+ | FB7_R3− | FB7_T2+ | FB7_T2− | FB7_R2+ | FB7_R2− |
|  |  | FB7_T1+ | FB7_T1− | FB7_R1+ | FB7_R1− | FB7_T0+ | FB7_T0− | FB7_R0+ | FB7_R0− |
|  | FB6 | FB6_T3+ | FB6_T3− | FB6_R3+ | FB6_R3− | FB6_T2+ | FB6_T2− | FB6_R2+ | FB6_R2− |
|  |  | FB6_T1+ | FB6_T1− | FB6_R1+ | FB6_R1− | FB6_T0+ | FB6_T0− | FB6_R0+ | FB6_R0− |
|  | FB5 | FB5_T3+ | FB5_T3− | FB5_R3+ | FB5_R3− | FB5_T2+ | FB5_T2− | FB5_R2+ | FB5_R2− |
|  |  | FB5_T1+ | FB5_T1− | FB5_R1+ | FB5_R1− | FB5_T0+ | FB5_T0− | FB5_R0+ | FB5_R0− |
|  | FB4 | FB4_T3+ | FB4_T3− | FB4_R3+ | FB4_R3− | FB4_T2+ | FB4_T2− | FB4_R2+ | FB4_R2− |
|  |  | FB4_T1+ | FB4_T1− | FB4_R1+ | FB4_R1− | FB4_T0+ | FB4_T0− | FB4_R0+ | FB4_R0− |
|  | FB3 | FB3_T3+ | FB3_T3− | FB3_R3+ | FB3_R3− | FB3_T2+ | FB3_T2− | FB3_R2+ | FB3_R2− |
|  |  | FB3_T1+ | FB3_T1− | FB3_R1+ | FB3_R1− | FB3_T0+ | FB3_T0− | FB3_R0+ | FB3_R0− |
| P23 | FB2 | FB2_T3+ | FB2_T3− | FB2_R3+ | FB2_R3− | FB2_T2+ | FB2_T2− | FB2_R2+ | FB2_R2− |
|  |  | FB2_T1+ | FB2_T1− | FB2_R1+ | FB2_R1− | FB2_T0+ | FB2_T0− | FB2_R0+ | FB2_R0− |
|  | FB1 | FB1_T3+ | FB1_T3− | FB1_R3+ | FB1_R3− | FB1_T2+ | FB1_T2− | FB1_R2+ | FB1_R2− |
|  |  | FB1_T1+ | FB1_T1− | FB1_R1+ | FB1_R1− | FB1_T0+ | FB1_T0− | FB1_R0+ | FB1_R0− |
|  | Shmc | SM2_T+ | SM2_T− | SM2_R+ | SM2_R− | SM1_T+ | SM1_T− | SM1_R+ | SM1_R− |
|  | BASE12 | B12_T1+ | B12_T1− | B12_R1+ | B12_R1− | B12_T0+ | B12_T0− | B12_R0+ | B12_R0− |
|  | BASE11 | B11_T1+ | B11_T1− | B11_R1+ | B11_R1− | B11_T0+ | B11_T0− | B11_R0+ | B11_R0− |
| P24 | BASE10 | B10_T1+ | B10_T1− | B10_R1+ | B10_R1− | B10_T0+ | B10_T0− | B10_R0+ | B10_R0− |
|  | BASE9 | B9_T1+ | B9_T1− | B9_R1+ | B9_R1− | B9_T0+ | B9_T0− | B9_R0+ | B9_R0− |
|  | BASE8 | B8_T1+ | B8_T1− | B8_R1+ | B8_R1− | B8_T0+ | B8_T0− | B8_R0+ | B8_R0− |
|  | BASE7 | B7_T1+ | B7_T1− | B7_R1+ | B7_R1− | B7_T0+ | B7_T0− | B7_R0+ | B7_R0− |
|  | BASE6 | B6_T1+ | B6_T1− | B6_R1+ | B6_R1− | B6_T0+ | B6_T0− | B6_R0+ | B6_R0− |
|  | BASE5 | B5_T1+ | B5_T1− | B5_R1+ | B5_R1− | B5_T0+ | B5_T0− | B5_R0+ | B5_R0− |
|  | BASE4 | B4_T1+ | B4_T1− | B4_R1+ | B4_R1− | B4_T0+ | B4_T0− | B4_R0+ | B4_R0− |
|  | BASE3 | B3_T1+ | B3_T1− | B3_R1+ | B3_R1− | B3_T0+ | B3_T0− | B3_R0+ | B3_R0− |
|  | BASE2 | B2_T1+ | B2_T1− | B2_R1+ | B2_R1− | B2_T0+ | B2_T0− | B2_R0+ | B2_R0− |
|  | BASE1 | B1_T1+ | B1_T1− | B1_R1+ | B1_R1− | B1_T0+ | B1_T0− | B1_R0+ | B1_R0− |

For Fabric exchange channels, all signals of P21 and P22 and some signals of P23 are used here. In Table 1, a channel name beginning with "FB" represents a Fabric channel. Taking a channel 7 (FB7) as an example, the channel 7 uses signals listed in Table 2.

TABLE 2

| FB7_T3+ | FB7_T3− | FB7_R3+ | FB7_R3− | FB7_T2+ | FB7_T2− | FB7_R2+ | FB7_R2− |
|---------|---------|---------|---------|---------|---------|---------|---------|
| FB7_T1+ | FB7_T1− | FB7_R1+ | FB7_R1− | FB7_T0+ | FB7_T0− | FB7_R0+ | FB7_R0− |

FB7_R0+ and FB7_R0− indicate a pair of difference receiving signals (corresponding to a small rectangle in FIG. 5), and FB7_T0+ and FB7_T0− indicate a pair of difference sending signals. It can be seen that, the channel 7 uses eight pairs of difference signals in total, which specifically include:

four pairs of difference sending signals:
(1) FB7_T0+, FB7_T0—; (2) FB7_T1+, FB7_T1−; (3) FB7_T2+, FB7_T2−; (4) FB7_T3+, FB7_T3− and four pairs of difference receiving signals:
(1) FB7_R0+, FB7_R0−; (2) FB7_R1+, FB7_R1−; (3) FB7_R2+, FB7_R2−; (4) FB7_R3+, FB7_R3−.

Indication of each signal of other Fabric exchange channels is similar to that of the FB7, which is not described in detail here again.

To implement the second exchange channel that is independent of Fabric exchange channels, the embodiment of the present invention uses two pairs of difference signals, where one pair of difference signals are difference sending signals, and the other pair of difference signals are difference receiving signals. Referring to Table 1, a second exchange channel 1 (FC1) includes signals listed in Table 3. In Table 3, FC1_R+ and FC1_R1− indicate a pair of difference receiving signals (corresponding to a small rectangle in FIG. 5), and FC1_T+ and FC1_T− indicate a pair of difference sending signals.

TABLE 3

| FC1_T+ | FC1_T− | FC1_R+ | FC1_R− |
|--------|--------|--------|--------|

For definitions of signals used by other second exchange channels (such as FC2-FC12), reference may be made to definitions in Table 1, where each channel also includes a pair of difference receiving signals and a pair of difference sending signals.

Through the foregoing description of definitions of specific signals of connectors, persons skilled in the art may design, according to definitions of these signals, Fabric exchange channels and second exchange channels that are independent of the Fabric exchange channels.

In the embodiment of the present invention, a service board needs to be connected to two exchange boards. Therefore, similar to the design of the exchange board, corresponding connectors also need to be set on the service boards which are then physically and electrically connected to the backboard through connectors on the backboard, and then the service boards are connected to exchange boards through cables on the backboard, and thereby electrical signal connection between service boards and exchange boards is implemented, forming Fabric exchange channels and second exchange channels. Correspondingly, a connector in the Fabric interface of a service board includes a difference sending and receiving port pair that is electrically connected, through the backboard, to the difference sending and receiving port pair that forms the second exchange channel in the connector 20 in the Fabric interface of the exchange board.

In the embodiment of the present invention, two exchange boards are not connected through the backboard, but are connected by using cables through a panel in front of the subrack. The technology of connecting exchange boards through the panel is well-known by persons skilled in the art, which is not described in detail here again.

Embodiment 3

The embodiment of the present invention describes several application scenarios of the solution in detail based on the foregoing Embodiment 1 and Embodiment 2. In the embodiment of the present invention, a Fabric exchange channel (a first exchange channel) bears IP data, and a second exchange channel may be used to bear data of services such as the FC (Fiber Channel, FC), TDM (Time-division multiplexing, TDM), SAS (Serial Attached SCSI, SAS), SCSI (Small Computer System Interface, SCSI), SATA (Serial ATA, SATA) and SSD (solid-state drive, SSD).

The broadband service data borne by the Fabric exchange channel being IP data, and the narrowband service data borne by the second exchange channel being FC or TDM (presented as FC/TDM) service data are taken as an example in the following.

Figure 6:
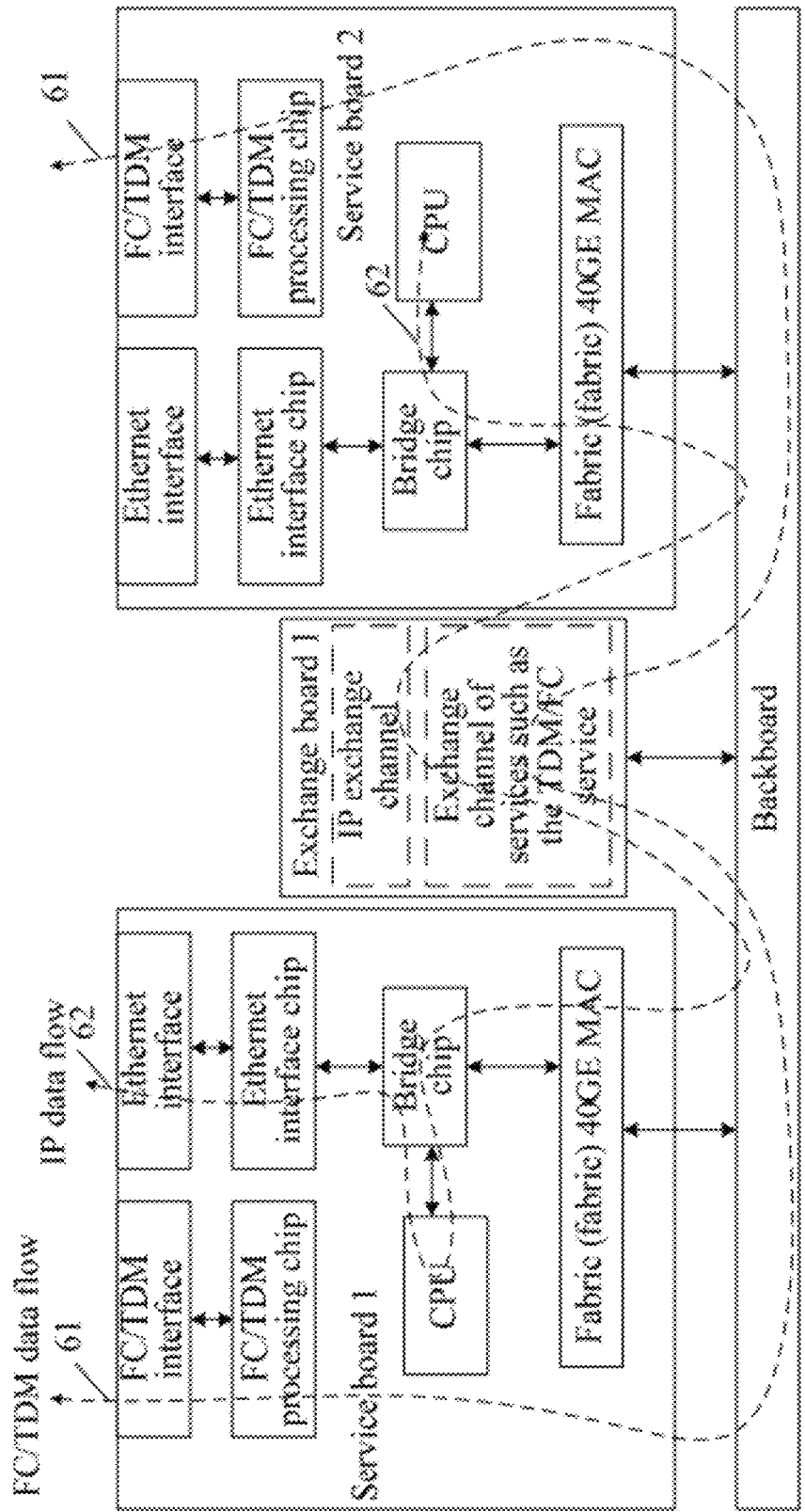
FIG. 6 is a schematic diagram of an application scenario of embodiments of the present invention according to Embodiment 3 of the present invention.

FIG. 6 is an application scenario according to the embodiment of the present invention, where a curve 62 represents an IP data flow. It can be seen from FIG. 6 that, the IP data flow 62 passes through an Ethernet interface, an Ethernet interface chip, a bridge chip (such as a north and south bridge), a CPU, a Fabric 40GE MAC (service 40G Ethernet physical layer chip) of a service board, a backboard, an IP exchange channel of an exchange board 1 to reach a service board 2, then passes through a Fabric 40GE MAC, a bridge chip of the service board 2, to be processed by the CPU. The technologies of processing the IP data flow by each of the foregoing units are well-known by persons skilled in the art, which are not described in detail here again.

In this application scenario, a curve 61 represents an FC/TDM data flow. It can be seen from FIG. 6 that, the FC/TDM data flow passes through an FC/TDM interface, an FC/TDM processing chip, the backboard, a TDM/FC service channel of the exchange board 1 and the backboard to reach an FC/TDM processing chip and an FC/TDM interface of the service board 2, so as to complete exchange of FC/TDM data. The technologies of processing the FC/TDM data by each of the foregoing units are also well-known by persons skilled in the art, which are not described in detail here again.

Figure 7:
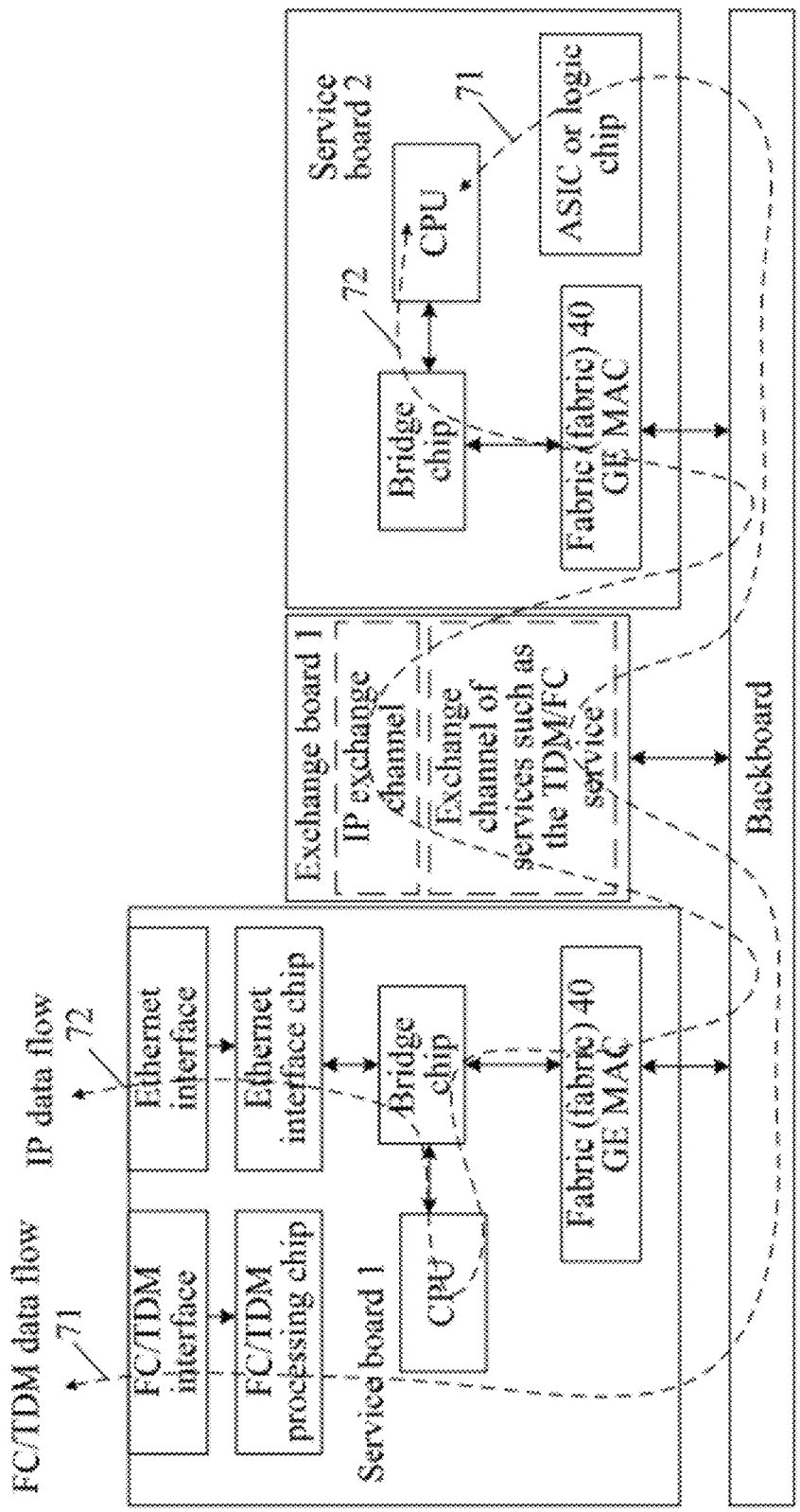
FIG. 7 is a schematic diagram of another application scenario of embodiments of the present invention according to Embodiment 3 of the present invention.

FIG. 7 is another application scenario according to the embodiment of the present invention, where processing of an IP data flow 72 is the same as that in the scenario shown in FIG. 6, which is not described in detail here again. An FC/TDM data flow 71 passes through an FC/TDM interface, an FC/TDM processing chip of a service board 1, a backboard, a TDM/FC service exchange channel to reach an ASIC or a logic chip of a service board 2 for processing, and then a processing result is sent to the CPU of the service board 2 for processing. In the embodiment of the present invention, the method of processing the FC/TDM data by the ASIC or logic chip or the CPU is not limited, and persons skilled in the art may perform processing corresponding to a specific service on the FC/TDM data according to the application of the specific service.

Figure 8:
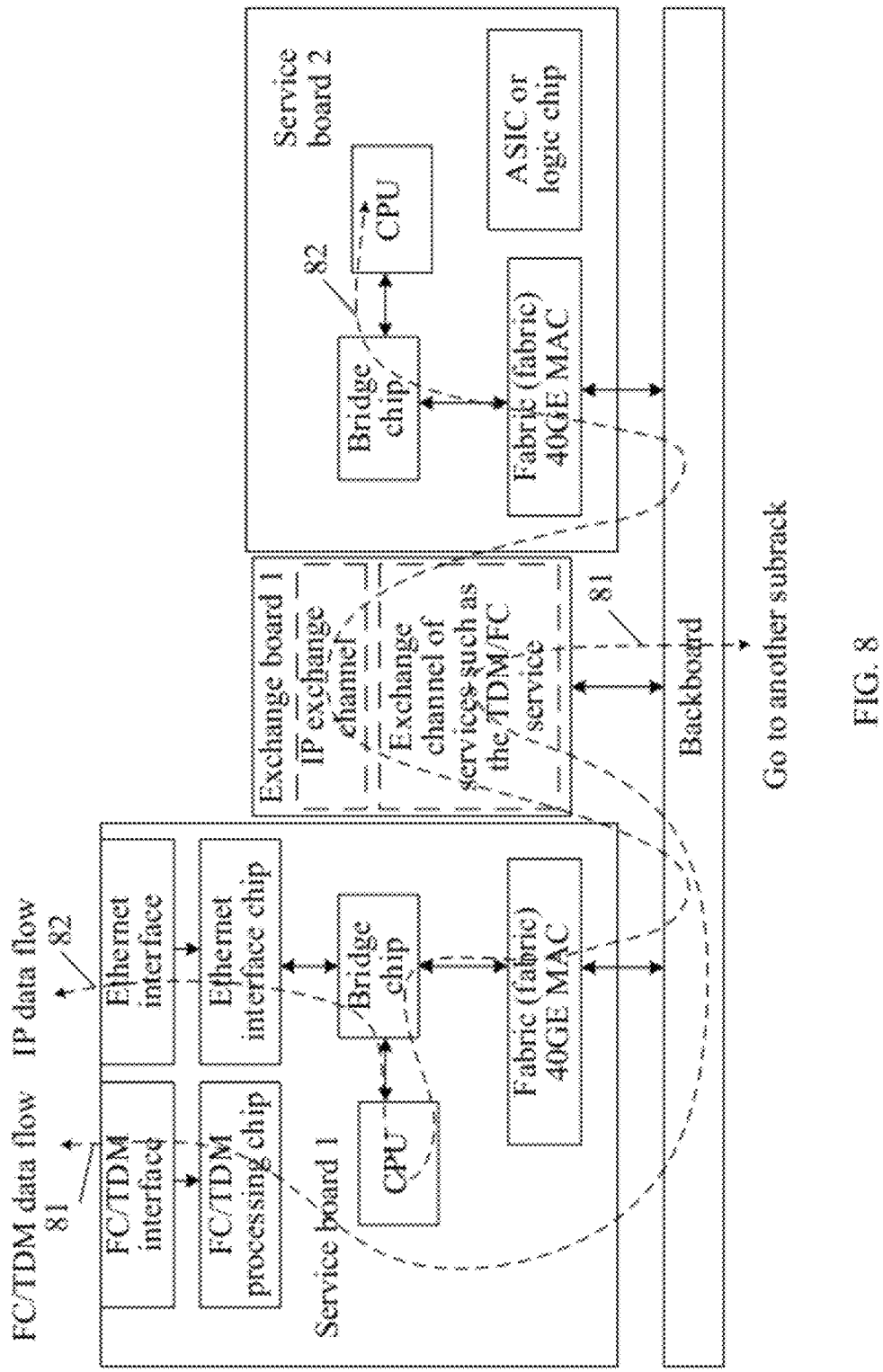
FIG. 8 is a schematic diagram of another application scenario of embodiments of the present invention according to Embodiment 3 of the present invention.

FIG. 8 is another application scenario according to the embodiment of the present invention, where processing of an IP data flow 82 is in the same as that in the scenario shown in FIG. 6, which is not described in detail here again. An FC/TDM data flow 81 passes through an FC/TDM interface, an FC/TDM processing chip of a service board 1, a backboard, a TDM/FC service exchange channel, and then exchanges data with a board in another subrack through the backboard.

Figure 9:
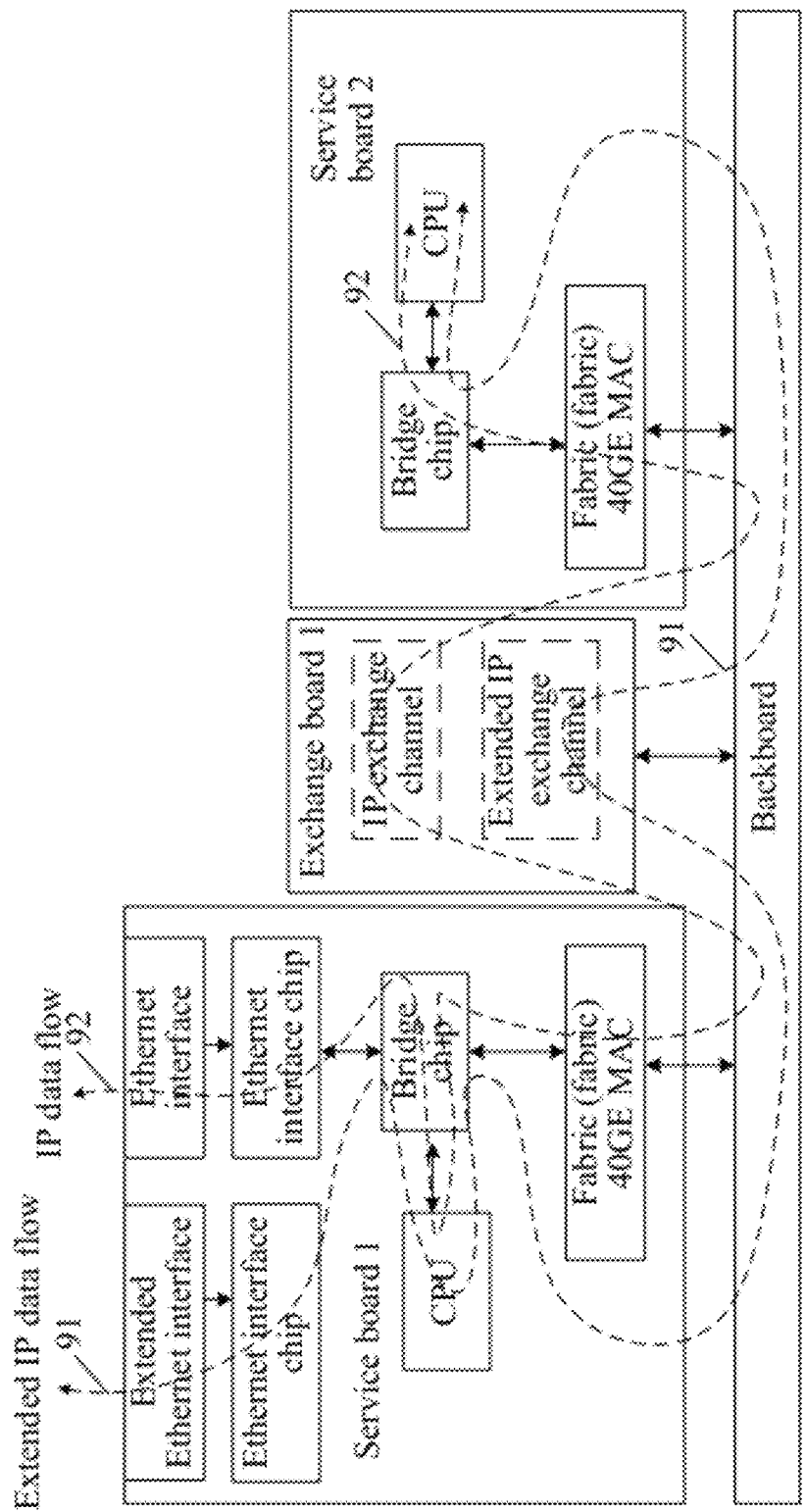
FIG. 9 is a schematic diagram of another application scenario of embodiments of the present invention according to Embodiment 3 of the present invention.

FIG. 9 is another application scenario according to the embodiment of the present invention, where the broadband service data is IP data and the narrowband service data is extended IP data. That is, the bandwidth of the extended IP data is smaller than the bandwidth of the IP data of the broadband service data, and the extended IP data is used as an extension of an existing IP service.

In the application scenario, processing of an IP data flow 92 is in the same as that in the scenario shown in FIG. 6, which is not described in detail here again. An extended IP data flow 91 passes through an extended Ethernet interface, an Ethernet interface chip, a bridge chip and a CPU of a service board 1, a backboard, an extended IP exchange channel and the backboard to reach a service board 2, then passes through a bridge chip of the service board 2, to be processed by the CPU of the service board 2.

It should be noted that, in the foregoing scenarios, the implementation method of the first exchange channel (IP exchange channel) and the second exchange channel (exchange channel of services such as TDM/FC or extended IP exchange channel) is described in the foregoing embodiments, which is not described in detail here again. The hardware of service boards for processing a variety of data in the foregoing scenarios of the embodiment of the present invention is merely some specific examples, and persons skilled in the art may design corresponding hardware circuits according to a specific service application, and use two independent channels to exchange data, which is not limited here.

It can be seen from the foregoing application scenarios that, when the narrowband service data borne by the second exchange channel is FC/TDM service data, the FC/TDM service data and IP data are transmitted through two independent channels in an exchange board, and the FC/TDM service data does not need to be converted into IP data and processed through the IP exchange channel, and thereby the design is simplified, service delay is decreased and service performance is improved. When the narrowband service data borne by the second exchange channel is extended IP data, extension of the existing IP data service may be implemented.

Embodiment 4

It is mentioned in the background of the invention that, in the prior art, narrowband data is converted into IP packets and transmitted through a Fabric channel. In this case, a signal channel constituted by a difference sending and receiving port pair of the Fabric channel is occupied to transmit narrowband service data. After the embodiment of the present invention is adopted, a second exchange channel is added to the connector 20 in the Fabric interface zone. Therefore, new exchange boards, service boards and the backboard need to be changed (that is, corresponding signal definitions need to be added to the exchange boards and the service boards, and the exchange boards and the service boards are electrically connected through newly added cables on the backboard), resulting in a compatibility problem due to different designs between new exchange boards and old service boards or between new service boards and old exchange boards.

To solve the compatibility problem, in the embodiment of the present invention, an electrical cross switch is added to both newly designed exchange boards and service boards.

Figure 10:
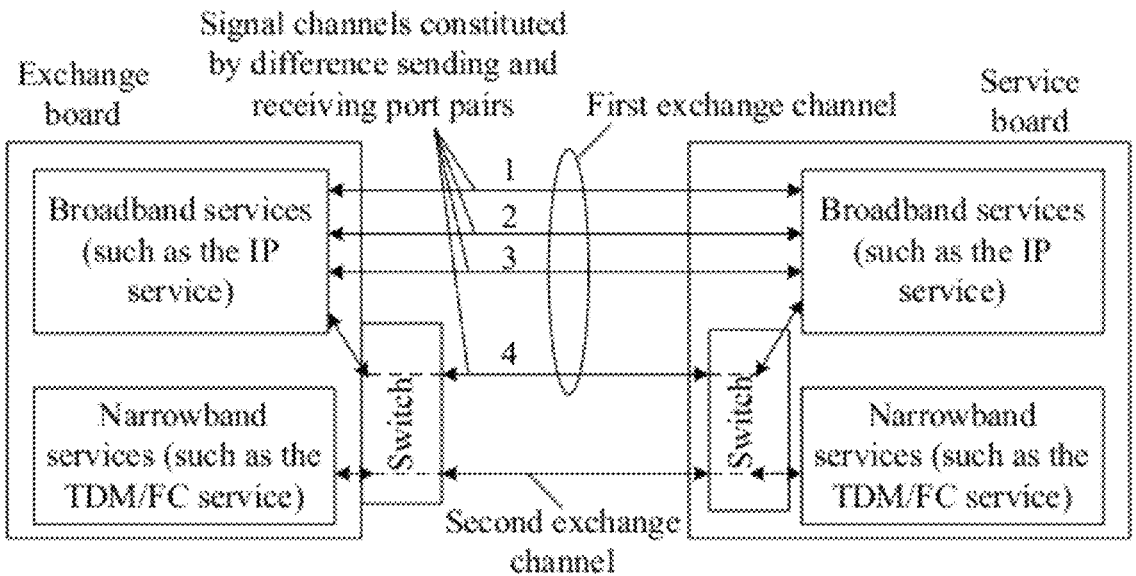
FIG. 10 is a schematic structural diagram of boards integrated with electronic cross switches according to Embodiment 4 of the present invention.
Figure 11:
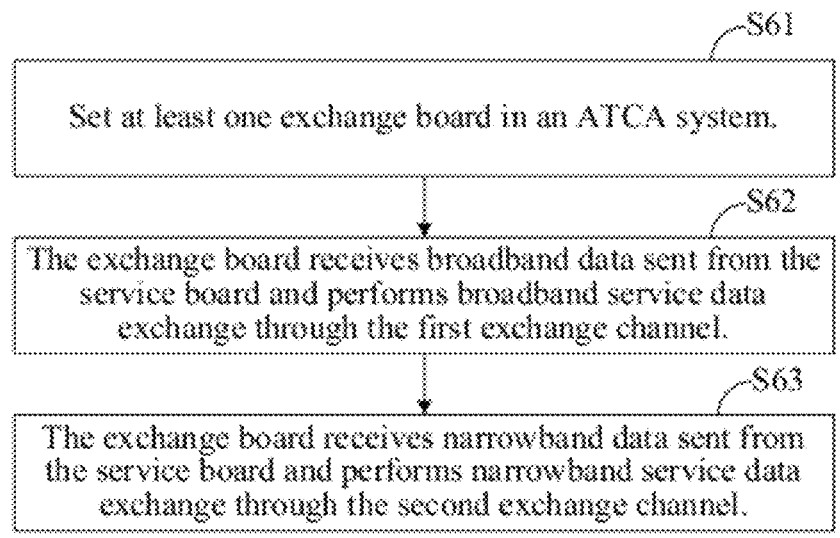
FIG. 11 is a schematic diagram of an ATCA data exchange method according to Embodiment 6 of the present invention.

FIG. 10 is a schematic diagram of connection between two new boards according to the embodiment of the present invention. The switch may be set inside a board or connected to a board as a daughter board, which is not limited here. When a new board is connected to an old board, the structure of the new board is shown in FIG. 10, and the old board still uses an existing design (three difference sending and receiving port pairs of a Fabric channel are used for broadband services, and one difference sending and receiving port pair is used for narrowband services).

When a new board (an exchange board or a service board) is connected to an old board, channels are selected through switches, so that the new board utilizes a difference sending and receiving port pair of a Fabric channel (for example, the difference sending and receiving port pair forming a channel 4 in FIG. 10) to execute narrowband data exchange, so as to be compatible with existing equipment.

When a new board is connected to a new board, channels are selected through switchover of the switches, so that the new boards utilize newly added second exchange channels (channels defined in the connector 20 in the Fabric interface zone of an exchange board) to perform narrowband data exchange. All four signal channels of the Fabric channel are used to implement broadband data exchange, rather than one signal channel (such as the channel 4) of the four channels, which is used to implement narrowband data exchange.

In the embodiment of the present invention, electrical cross switches are set, and through switchover of the switches, new boards may be connected to new boards or old boards, thereby implementing compatibility between new boards and old boards.

Embodiment 5

The embodiment of the present invention provides an exchange board based on the foregoing embodiments, in which the exchange board is applied in an ATCA data exchange system, where the ATCA data exchange system includes a backboard, at lease one exchange board and at least one service board; where the exchange board includes at least one Fabric port group, and each Fabric port group is connected to one service board through the backboard to form a first exchange channel for broadband service data exchange, where the Fabric port group includes four difference sending and receiving port pairs, and each difference sending and receiving port pair includes a pair of difference receiving ports and a pair of difference sending ports; and a connector 20 in a Fabric interface of the exchange board includes at least one difference sending and receiving port pair, and each difference sending and receiving port pair is connected to one service board through the backboard to form a second exchange channel that is independent of the first exchange channel, for narrowband service data exchange that is independent of the broadband data exchange through the second exchange channel separately.

For a specific implementation form of the exchange board according to the embodiment of the present invention, reference may be made to related description in each of the foregoing embodiments, which is not described in detail here again.

Through the embodiment of the present invention, the narrowband data may not need to be packed and transmitted through the first exchange channel, and thereby processing of narrowband services is simplified, service delay is decreased and service performance is improved.

Embodiment 6

The embodiment of the present invention provides an ATCA data exchange method based on the foregoing embodiments, where the method includes:

S61: Set at least one exchange board in an ATCA system, where the exchange board includes at least one Fabric port group, and each Fabric port group is connected to one service board through a backboard to form a first exchange channel for broadband service data exchange, where the Fabric port group includes four difference sending and receiving port pairs, and each difference sending and receiving port pair includes a pair of difference receiving ports and a pair of difference sending ports; a connector 20 in the Fabric interface of the exchange board defined by the ATCA specifications includes at least one difference sending and receiving port pair, and each difference sending and receiving port pair is connected to one service board through the backboard to form a second exchange channel that is independent of the first exchange channel, for narrowband service data exchange that is independent of the broadband data exchange through the second exchange channel separately.

S62: The exchange board receives broadband data sent from the service board and performs broadband service data exchange through the first exchange channel.

S63: The exchange board receives narrowband data sent from the service board and performs narrowband service data exchange through the second exchange channel.

The sequence of executing the foregoing steps S62 and S63 of the method is not limited. Steps S62 and S63 may be performed simultaneously, or only step S62 or S63 may be performed in a certain period.

The specific method for processing broadband services and narrowband services as well as related processing units are not limited in the embodiment of the present invention, and persons skilled in the art may select processing units related to specific services according to a practical application scenario to implement corresponding broadband services and narrowband services through the first exchange channel and the second exchange channel.

Through the embodiment of the present invention, the narrowband data may not need to be packed and transmitted through the first exchange channel, and thereby processing of narrowband services is simplified, service delay is decreased and service performance is improved.

Persons skilled in the art may understand that all or part of the steps of the method according to the embodiments of the present invention may be implemented by a program instructing relevant hardware. The program may be stored in a computer readable storage medium. When the program runs, the steps of each method according to the embodiments of the present invention may be performed. The storage medium may be a magnetic disk, an optical disk, a Read-Only Memory (Read-Only Memory, ROM), a Random Access Memory (Random Access Memory, RAM), and the like.

The objectives, technical solutions, and beneficial effects of the present invention have been described in further detail through the specific embodiments. It should be understood that the above descriptions are merely exemplary embodiments of the present invention, but not intended to limit the protection scope of the present invention. Any modifications, equivalent replacements, or improvements made without departing from the spirit and principle of the present invention should fall within the protection scope of the present invention.

What is claimed is:

1. An advanced telecommunications computing architecture (ATCA) data exchange system, comprising:
    a backboard, at least one exchange board and at least one service board;
    wherein the exchange board comprises at least one Fabric port group, and each Fabric port group is connected to one service board through the backboard to form a first exchange channel for broadband service data exchange, wherein the Fabric port group comprises four difference sending and receiving port pairs, and each difference sending and receiving port pair comprises a pair of difference receiving ports and a pair of difference sending ports; and
    a connector in the exchange board, which is numbered 20 in a Fabric interface defined by Peripheral Component Interconnect Industrial Computer Manufacturers Group PICMG specifications, comprises at least one difference sending and receiving port pair, and each difference sending and receiving port pair is connected to a service board through the backboard to form a second exchange channel, which is independent of the first exchange channel and is configured for a separate narrowband service data exchange that is independent of the broadband data exchange.

2. The ATCA data exchange system according to claim 1, wherein:
    the ATCA data exchange system comprises 12 service boards, the connector 20 in the Fabric interface of the exchange board comprises 12 difference sending and receiving port pairs, and the 12 difference sending and receiving port pairs are all ports of the connector 20 except for ports occupied by a clock CLK channel and an update UPDATE channel.

3. The ATCA data exchange system according to claim 1, wherein:
    a connector in the Fabric interface of the service board comprises a difference sending and receiving port pair that is electrically connected, through the backboard, to the difference sending and receiving port pair that forms the second exchange channel in the connector 20 in the Fabric interface of the exchange board.

4. The ATCA data exchange system according to claim 1, wherein:
    the exchange board further comprises an electrical cross switch, configured to select a channel, so that when the exchange board is connected to a service board in a second ATCA data exchange system, one difference sending and receiving port pair in the Fabric port group is connected to a service board in the second ATCA system through a backboard of the second ATCA system to form an independent narrowband channel, wherein three difference sending and receiving port pairs in the Fabric port group form a broadband channel in the second ATCA system, and one difference sending and receiving port pair in the Fabric port group forms a narrowband channel.

5. An exchange board, applied in a first advanced telecommunications computing architecture (ATCA) data exchange system, and forming an exchange channel with at least one service board through a backboard in the ATCA data exchange system for data exchange;
    wherein the exchange board comprises at least one Fabric port group, and each Fabric port group is connected to one service board through the backboard to form a first exchange channel for broadband service data exchange, wherein the Fabric port group comprises four difference sending and receiving port pairs, and each difference sending and receiving port pair comprises a pair of difference receiving ports and a pair of difference sending ports; and a connector in the exchange board, which is numbered 20 in a Fabric interface defined by Peripheral Component Interconnect Industrial Computer Manufacturers Group PICMG, comprises at least one difference sending and receiving port pair, and each difference sending and receiving port pair is connected to one service board through the backboard to form a second exchange channel, which is independent of the first exchange channel and is configured for a separate narrowband service data exchange that is independent of the broadband data exchange.

6. The exchange board according to claim 5, wherein:

the exchange board further comprises an electrical cross switch, configured to select channels, so that when the exchange board is connected to a service board in a second ATCA data exchange system, one difference sending and receiving port pair of the Fabric port group is connected to a service board in the second ATCA system through a backboard of the second ATCA system to form an independent narrowband channel, wherein three difference sending and receiving port pairs of the Fabric port group form a broadband channel in the second ATCA system, and one difference sending and receiving port pair of the Fabric port group forms a narrowband channel.

7. The exchange board according to claim 6, wherein:

the electrical cross switch is further configured to select channels, so that at least one Fabric port group of the exchange board in the first ATCA data exchange system is connected to one service board of the first ATCA data exchange system through a backboard of the first ATCA data exchange system to form a first exchange channel for broadband service data exchange, and at least one difference sending and receiving port pair of the connector 20 in the Fabric interface of the first ATCA data exchange system is connected to a service board in the first ATCA data exchange system through the backboard of the ATCA data exchange system to form a second exchange channel.

8. An advanced telecommunications computing architecture (ATCA) data exchange method, comprising:

setting at least one exchange board in an ATCA system, wherein the exchange board comprises at least one Fabric port group, and each Fabric port group is connected to a service board through a backboard to form a first exchange channel for broadband service data exchange, wherein each Fabric port group comprises four difference sending and receiving port pairs, and each difference sending and receiving port pair comprises a pair of difference receiving ports and a pair of difference sending ports; a connector 20 in the exchange board in a Fabric interface defined by Peripheral Component Interconnect Industrial Computer Manufacturers Group PICMG comprises at least one difference sending and receiving port pair, and each difference sending and receiving port pair is connected to one service board through the backboard to form a second exchange channel, which is independent of the first exchange channel and is configured for a separate narrowband service data exchange that is independent of the broadband data exchange;

receiving, by the exchange board, broadband data sent from the service board and performing broadband service data exchange through the first exchange channel; and receiving, by the exchange board, narrowband data sent from the service board and performing narrowband service data exchange through the second exchange channel.

9. The ATCA data exchange method according to claim 8, wherein the exchange board further comprises an electrical cross switch;

the method further comprising:

select a channel, by the electrical cross switch, so that when the exchange board is connected to a service board in a second ATCA data exchange system, one difference sending and receiving port pair in the Fabric port group is connected to a service board in the second ATCA system through a backboard of the second ATCA system to form an independent narrowband channel, wherein three difference sending and receiving port pairs in the Fabric port group form a broadband channel in the second ATCA system, and one difference sending and receiving port pair in the Fabric port group forms a narrowband channel.

* * * * *